United States Patent [19]

Coates

[11] Patent Number: 5,048,979

[45] Date of Patent: Sep. 17, 1991

[54] SELF-ADJUSTING WHEEL BEARING ASSEMBLY

[76] Inventor: Gregory G. Coates, 2934 Adams St., Wall Township, Monmouth County, N.J. 07719

[21] Appl. No.: 537,255

[22] Filed: Jun. 13, 1990

[51] Int. Cl.⁵ .............................................. F16C 23/08
[52] U.S. Cl. .................................... 384/519; 384/517; 384/563; 384/583; 384/589
[58] Field of Search ........................ 384/449, 517–519, 384/563, 583, 586, 589, 571

[56] References Cited

U.S. PATENT DOCUMENTS

| 2,173,561 | 9/1939 | Olson | 384/517 |
| 3,746,412 | 7/1973 | Hay | 384/563 |
| 3,901,568 | 8/1975 | Gadd et al. | 384/589 |

FOREIGN PATENT DOCUMENTS

| 491173 | 2/1930 | Fed. Rep. of Germany | 384/589 |
| 1409793 | 7/1988 | U.S.S.R. | 384/517 |

Primary Examiner—Thomas R. Hannon
Attorney, Agent, or Firm—Clifford G. Frayne

[57] ABSTRACT

A self-adjusting assembly for wheel bearings for an automotive vehicle in which the wheel of the vehicle is rotatably mounted on a spindle supported by an inner and outer wheel bearing, the self-adjusting assembly providing selective pressure on the outer wheel bearing to maintain its position by way of a threaded self-adjusting nut threadedly mounted onto the spindle or axle, a nonrotatable fixed washer mounted on the spindle, a biasing element positioned between the threaded self-adjusting nut and fixed washer, the biasing element engaging the self-adjusting nut and the fixed washer in order to provide inward pressure on the outer wheel bearing once the outer locking nut is secured to the spindle.

5 Claims, 5 Drawing Sheets

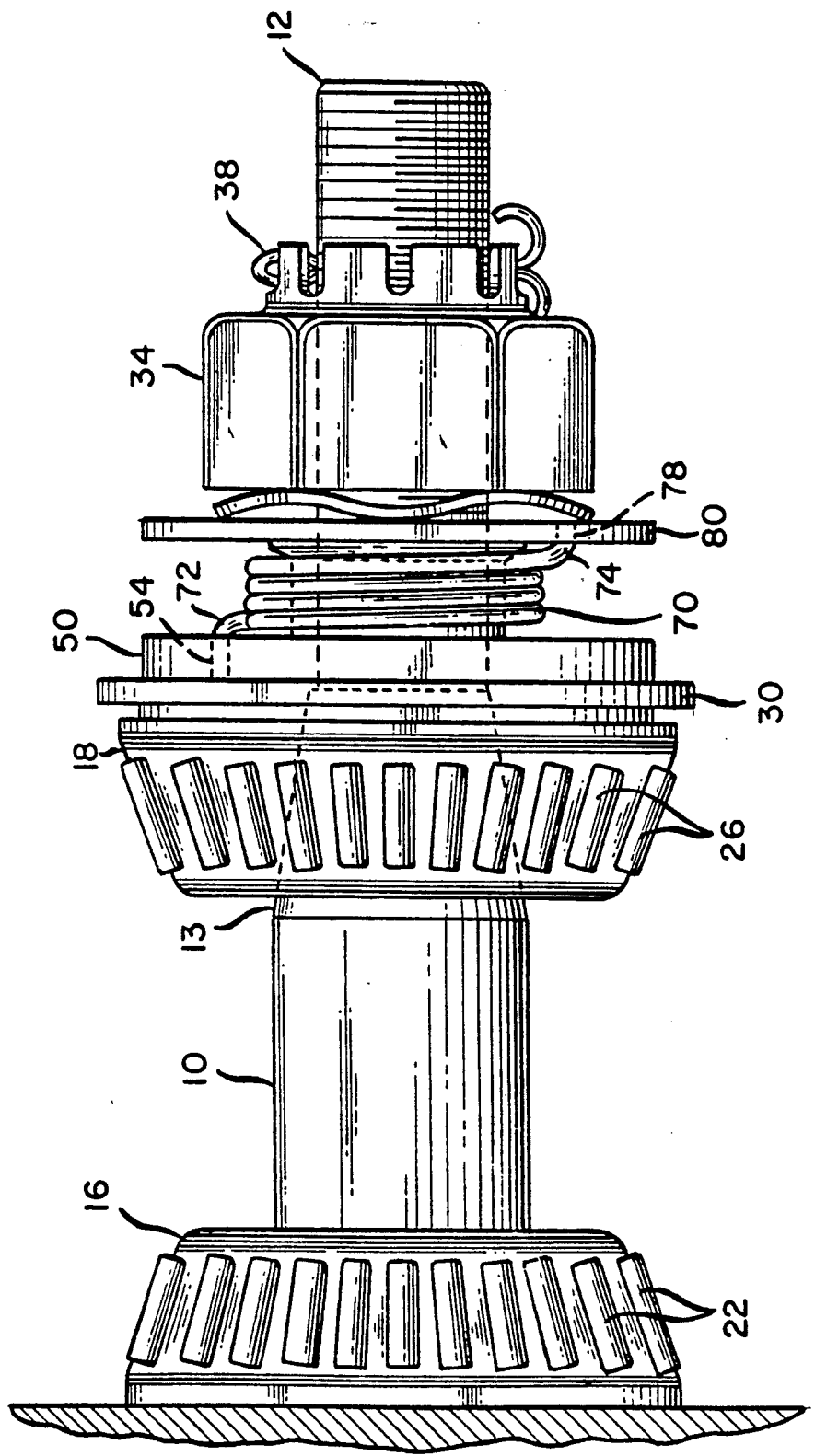

5,048,979

SELF-ADJUSTING WHEEL BEARING ASSEMBLY

FIELD OF INVENTION

The present invention relates to wheel bearings, and in particular, to automotive wheel bearings for the front wheels of a vehicle whereby the wheel bearing assembly self adjusts to maintain the appropriate pressure on the bearings.

BACKGROUND OF THE INVENTION

The front wheels of an automobile are normally mounted on a spindle with the wheel being supported on the spindle in contact with an inner and outer wheel bearing supporting the wheel and allowing for its free rotation. The rim and tire of the vehicle are mounted to the wheel. The practice has been to insert the inner wheel bearing on the spindle, to mount the wheel on the spindle and position the outer wheel bearing on the spindle in communication with the wheel such that the wheel rests on the inner and outer bearings. A fixed keyed washer is then positioned on the threaded stub axle adjacent the outer wheel bearing and secured in position by a locking nut secured by a split Cotter pin extending through the stub axle.

In the installation or replacement of front wheel bearings, the mechanic must ensure the positioning of the wheel bearing and the positioning of the fixed washer and locking nut in order to ensure that the wheel rotates freely without any wobble or play. If the wheel bearings are not sufficiently secured, the play in the wheel will result in a shorter life for the wheel bearings, uneven wear on the tire, a possible vibration felt by the driver through the steering wheel, and an overall unsafe condition in the operation of the vehicle. If the outer wheel bearing is secured too tightly, the bearing is not able to freely rotate thus causing premature wear and again, improper and unsafe handling of the vehicle.

Applicant's apparatus provides for a self-adjusting assembly positioned between the outer wheel bearing and the locking nut which will automatically adjust the pressure on the outer wheel bearing to adjust for any play with respect to its contact with the wheel while not causing it to be over tightened.

OBJECT OF THE INVENTION

An object of the present invention is to provide for a novel wheel bearing assembly which adjusts the pressure on the outer wheel bearing during operation of the vehicle.

Another object of the present invention is to provide for a novel wheel bearing assembly which ensures the proper positioning of the wheel bearings during their installation or replacement.

A still further object of the present invention is to provide for a novel wheel bearing assembly which self adjusts the pressure on the outer wheel bearing during operation and prevents the premature deterioration or wear on the wheel bearings.

A still further object of the present invention is to provide for a novel wheel bearing assembly which self adjusts the pressure on the wheel bearing, thus eliminating play between the wheel bearings and the wheel and ensuring the proper rotation of the wheel and its alignment thus extending tire wear.

SUMMARY OF THE INVENTION

These and other objects of the present invention are achieved by a wheel bearing assembly disposed on the spindle and stub axle of an automobile whereby a fixed washer, rotable self-adjusting nut, adjustment bias means and a fixed washer are disposed between the outer wheel bearing and the locking nut, the bias means engaged with the self-adjusting rotatable nut and the outer fixed washer such that the self-adjusting rotatable nut is automatically rotated to provide pressure against the outer wheel bearing to prevent any play between the outer wheel bearing and the wheel.

BRIEF DESCRIPTION OF THE DRAWINGS

A better understanding of the present invention as well as other objects and inventions thereof will become apparent on consideration of the detailed disclosure thereof especially when taken with the accompanying drawings wherein:

FIG. 3 is a side view of a front wheel spindle and axle having wheel bearings and self-adjusting assembly mounted thereon.

DETAILED DESCRIPTION OF THE DRAWINGS

Figure 1:
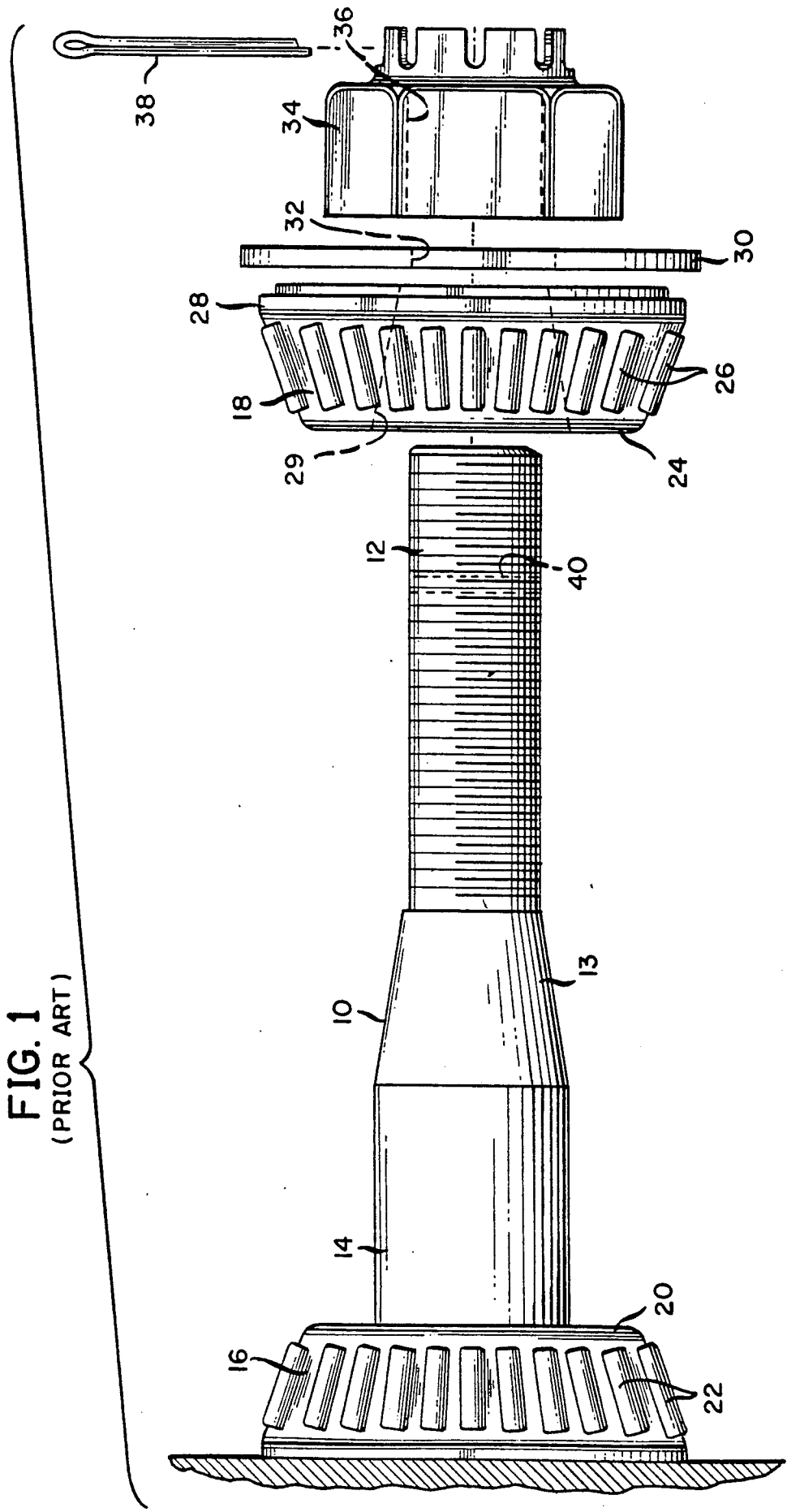
FIG. 1 is a side elevational exploded view of a typical front wheel spindle, axle and wheel bearing assembly for an automobile.

Refering to FIG. 1, there is illustrated a side elevational, exploded view of a typical front wheel spindle, or axle assembly. The spindle or axle 10 extends from the suspension assembly of the vehicle (not shown) and is typically circular in cross sectional area having a threaded stub axle outer end 12 and a smooth inner end 14 which is slightly tapered in the transition area 13 from the smooth surface to the threaded surface of stub axle end 12. Spindle 10 is designed to receive the wheel of the vehicle (not shown) in a freely rotating fashion. On the wheel of the vehicle would be mounted the rim containing the tire which would be mounted typically by lug nuts.

In order for the wheel and the rim and tire to rotate freely, a bearing surface must exist between spingle 10 and the wheel. This bearing surface is typically comprised of an inner wheel bearing 16 and an outer wheel bearing 18. Inner wheel bearing 16 comprises a housing 20 within which there are mounted a plurality of roller bearings which permits inner wheel bearing 16 to rotate freely about spindle 10. Outer wheel bearing 18 comprises a housing 24 about which there is positioned a plurality of roller bearings 26 in carrier 28. Carrier 28 and roller bearings 26 freely rotate about the axis of spindle 10. Outer wheel bearing 18 has an aperture therethrough, 28, which conforms to the tapered portion 13, of spindle 10. In installation, inner wheel bearing 16 would be positioned as shown in FIG. 1, the wheel of the vehicle would be positioned on spindle 10 and outer wheel bearing 18 would be positioned on spindle 10 in the tapered, transition area 13 thereby cooperating with inner wheel bearing 16 in supporting the wheel on spindle 10. A fixed washer 30 would then be positioned on spindle 10 adjacent to outer wheel bearing 18. Fixed washer 30 has a keyed aperture 32 therethrough for positioning on spindle 10. Thereafter, a locking nut 34, having an internally threaded aperture 36, would be secured to threaded stub axle end 12 of spindle 10 and tightened so as to secure outer wheel bearing 18 in position with the wheel of the vehicle, thus having the wheel of the vehicle supported by inner wheel bearing 16 and outer wheel bearing 18. A securing pin or Cotter pin 38 is secured through transverse aperture 40 in threaded stub axle end 12 of spindle 10 in cooperation with locking nut 34 in order to secure it in position and consequently secure the outer wheel bearing in position.

Figure 2:
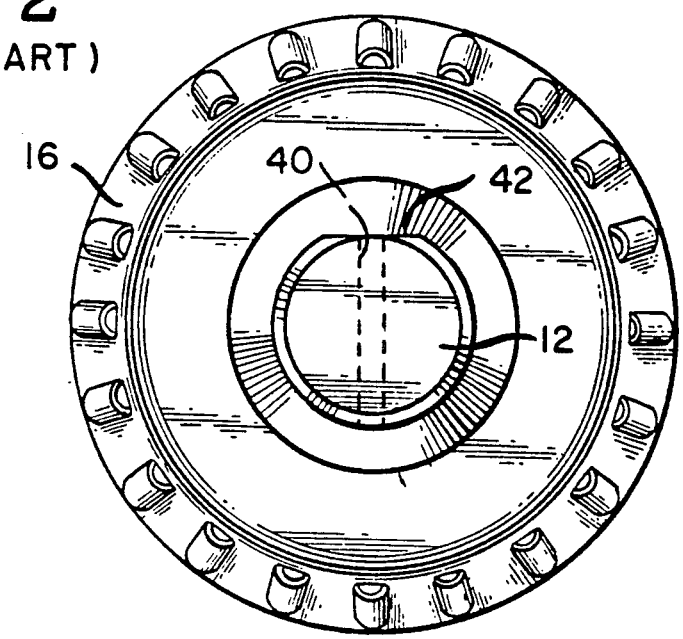
FIG. 2 is an end view of a typical front spindle and axle of an automobile.

FIG. 2 is an end view of a typical front spindle which illustrates the threaded outer end portion 12 of spindle 10 has a planer chord 42 which cooperates with aperture 32 on fixed washer 30 to act as the key to maintain fixed washer 30 in a non-rotatable position.

Figure 4:
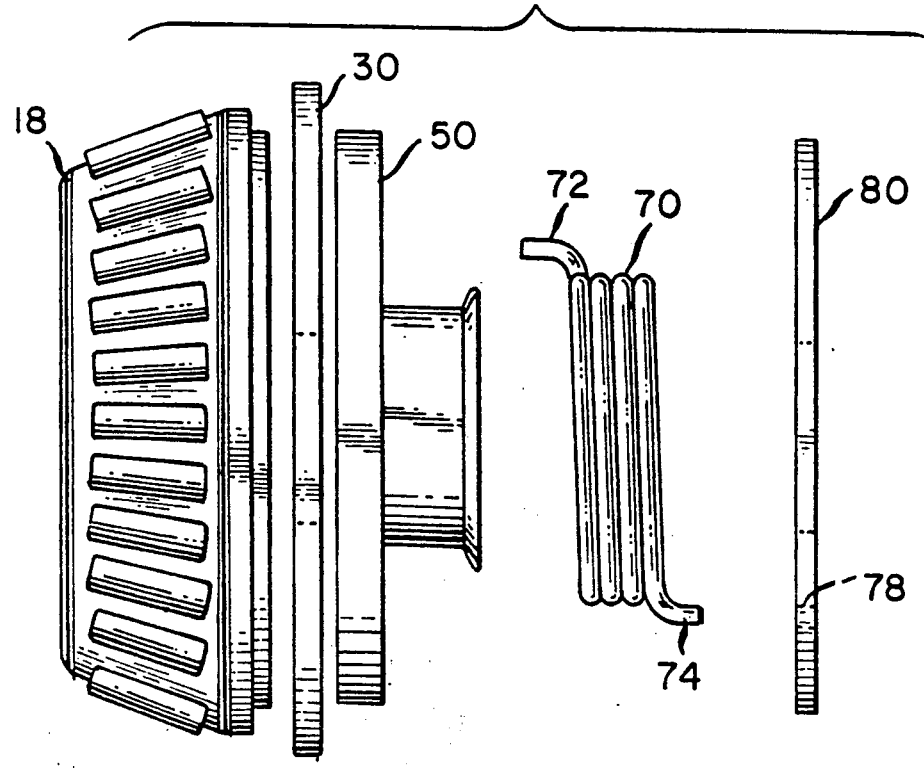
FIG. 4 is an exploded view of the self-adjusting wheel bearing assembly.
Figure 4A:
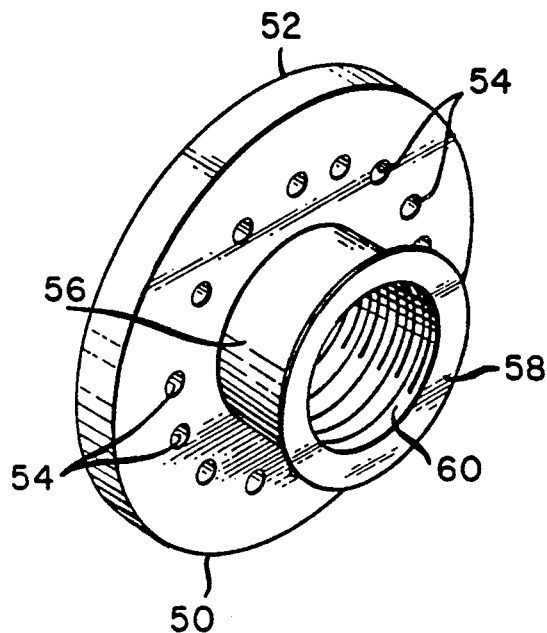
FIG. 4a is a perspective view of the self-adjusting nut of the self-adjusting wheel bearing assembly.
Figure 4C:
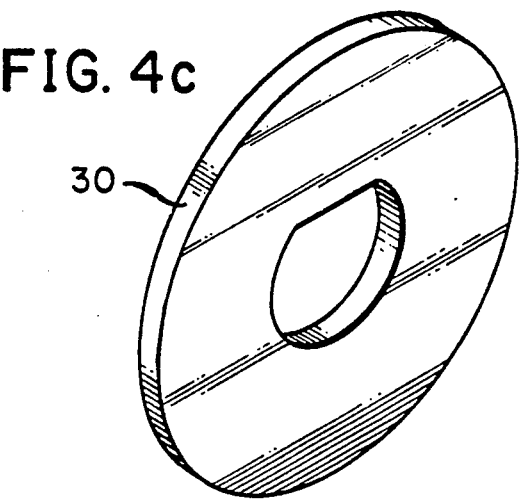
FIG. 4c is a perspective view of the inner fixed washer.

In installing the front wheel bearings, the mechanic should tighten locking nut 34 to ensure that there is no play while in outer wheel bearing 18 and that it is secure in its fit with the wheel of the vehicle, but it cannot be so tight as to freeze the bearing and prevent rotation. This adjustment of locking nut 34 is one of feel which is oftentimes inaccurate. Oftentimes, the fit is not secure and there is slight play in the outer wheel bearing which results in the premature wear of the wheel bearing, a possible wabble or play in the wheel and hence uneven and premature tire wear. These possibilities are negated by the use of Applicant's self-adjusting bearing as illustrated in FIGS. 3 and 4. Referring to FIG. 3, there is illustrated spindle or axle 10 having inner wheel bearing 16 mounted thereon and having outer wheel bearing 18 positioned thereon. Inner fixed washer 30 is positioned between outer wheel bearing 18 and lock nut 34 which is shown secured in position by locking pin or Cotter pin 38. Positioned between inner fixed washer 30 and lock nut 34 is Applicant's self-adjusting mechanism for continually maintaining the appropriate amount of pressure on outer wheel bearing 18. This mechanism is best understood by reference to FIG. 4 which is an exploded view of the outer wheel bearing assembly. Referring to FIG. 4, it can be seen that outer wheel bearing 18 is of standard configuration and fixed inner washer 30 shown in perspective in FIG. 4c, is of a standard design. Applicant has fabricated a self-adjusting nut 50 illustrated in perspective in FIG. 4a. Self-adjusting nut 50 has a planer annular base 52 having a plurality of apertures 54 positioned circumferentially thereabout. Centrally positioned on planer base 50 is a cylindrical shaft portion 56 having a lip portion 58. Locking nut 50 has an internally-threaded aperture 60 passing through cylindrical shaft portion 56 and planer base 52, aperture 60 conforming to the dimensions of threaded stub axle 12 of spindle 10.

Figure 4B:
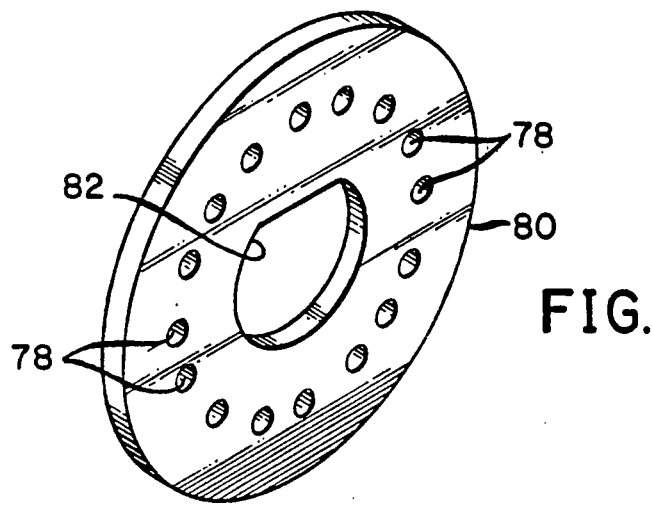
FIG. 4b is a perspective view of the outer fixed washer.

A biasing means in the form of a coil spring 70 is positioned on cylindrical shaft portion 56 of self-adjusting nut 50. First end 72 of coil spring 70 is notched in order that it may engage any one of the plurality of apertures 54 in planer annular base portion 52 of self-adjusting nut 50. The second end 74 of coil spring 70 is similarly notched so as to engage any one of the apertures 78 circumferentially disposed about outer fixed washer 80 which has a keyed aperture 82 passing therethrough as illustrated in FIG. 4b.

Applicant's self-adjusting nut 50, biasing means and fixed outer washer 80 cooperate when secured between fixed inner washer 30 and locking nut 34 to provide inward pressure on outer wheel bearing 18 as a result of the tension in coil spring 70.

Figure 5A:
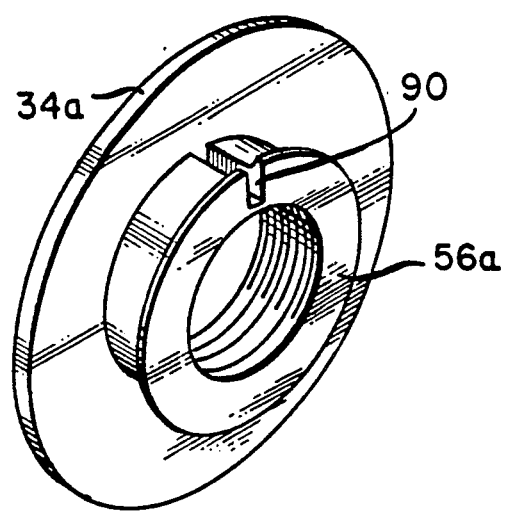
FIG. 5a is a perspective view of a second embodiment of the self-adjusting nut of the self-adjusting wheel bearing assembly.

Referring to FIG. 5a, there is illustrated a perspective view of self-adjusting nut 34a. Self-adjusting nut 34a is identical with respect to self-adjusting nut 34 with the exception that rather than a plurality of apertures 54 for engaging the biasing means, a slot or key 90 in shaft portion 56a for receipt of an engaging end of the biasing means.

Figure 5B:
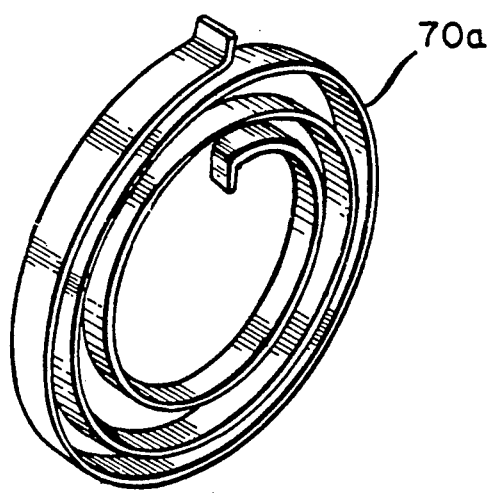
FIG. 5b is a perspective view of a second embodiment of the biasing means for the self-adjusting wheel bearing assembly.

FIG. 5b illustrates a second embodiment of the biasing means 70a which comprises a coiled spring in which the coiled springs are concentrically disposed within each other, each end having a notch.

Figure 5C:
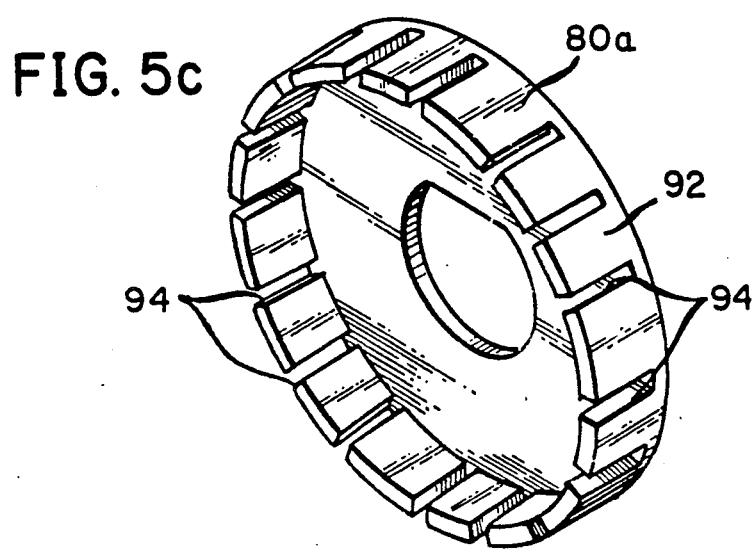
FIG. 5c is a perspective view of a second embodiment of the outer fixed washer of the self-adjusting wheel bearing assembly.

FIG. 5c illustrates a second embodiment of the outer fixed washer 80a. Outer fixed washer 80a no longer has the apertures 78 positioned on its surface, but rather, has an annular lip 92 positioned substantially perpendicular to the planer surface of outer fixed washer 80a. This annular lip has a plurality of notches 94 positioned therethrough to engage the outermost notch of biasing means 70a.

This second embodiment provides an assembly in which the width or depth of the assembly is reduced thereby occupying less space on the spindle.

In either of the embodiments illustrated, it can be seen that the tension created in the biasing means by positioning it on the self-adjusting nut and engaging the self-adjusting nut and the fixed washer creates an inward pressure on the threaded self-adjusting nut to put pressure on the outer wheel bearing and thus maintain its position with respect to the wheel of the vehicle.

The tension of the biasing means and the result in pressure placed upon the outer wheel bearing vary from vehicle to vehicle depending upon the size of the wheel. For example, the tension on a biasing means used for the wheel of a truck would be greater than the tension utilized for the biasing means for the wheel of an automobile.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A self-adjusting assembly for wheel bearings for an automotive vehicle in which the wheel is rotatably mounted on a spindle, supported by inner and outer wheel bearings, the wheel and wheel bearings maintained in position by a thrust washer and locking nut, the self-adjusting assembly positioned between said thrust washer and said locking nut, said self-adjusting assembly positioned between said thrust washer and said locking nut, said self-adjusting assembly comprising:
- a threaded, self-adjusting nut, threadedly mounted on said spindle adjacent to said thrust washer, said self-adjusting nut having an outwardly extending axial tubular shank, said tubular shank having an annular lip positioned thereabout;
- a non-rotatable washer slidably mounted on said spindle;
- a biasing means positioned between said threaded self-adjusting nut and said non-rotatable washer, said biasing means positioned on said tubular shank adjacent said annular lip of said tubular shank, said biasing means having a first end and a second end, said first end and said second end of said biasing means being angularly positioned to engage selective receiving apertures in said threaded self-adjusting nut and said non-rotatable washer, said locking nut secured on said spindle outwardly adjacent from said non-rotatable washer, said locking nut securing said self-adjusting assembly, said inner and outer wheel bearings and said wheel to said spindle such that said biasing means continuously exerts axial pressure on said thrust washer and said outer wheel bearing.

2. An assembly in accordance with claim 1 wherein said biasing means comprises a coil spring.

3. An assembly in accordance with claim 2 wherein said rotatable self-adjusting nut has a plurality of apertures for selectively engaging said biasing means.

4. An assembly in accordance with claim 3 wherein said non-rotable washer has a plurality of apertures for selective engagement with said biasing means.

5. An assembly in accordance with claim 4 wherein said biasing means in engaging said apertures in said self-adjusting nut and said fixed washer creates tension in said biasing means causing said self-adjusting nut to rotate and create pressure on said outer wheel bearing maintaining said outer wheel bearing in proper relationship with said wheel.

* * * * *